United States Patent
Matsui et al.

(10) Patent No.: US 12,234,315 B2
(45) Date of Patent: Feb. 25, 2025

(54) MOLDED PRODUCT AND USES THEREOF

(71) Applicant: MITSUI CHEMICALS, INC., Tokyo (JP)

(72) Inventors: Yusuke Matsui, Omuta (JP); Masayuki Furuya, Arao (JP); Shinsuke Ito, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 646 days.

(21) Appl. No.: 17/437,199

(22) PCT Filed: Mar. 13, 2020

(86) PCT No.: PCT/JP2020/011205
§ 371 (c)(1),
(2) Date: Sep. 8, 2021

(87) PCT Pub. No.: WO2020/189570
PCT Pub. Date: Sep. 24, 2020

(65) Prior Publication Data
US 2022/0169777 A1  Jun. 2, 2022

(30) Foreign Application Priority Data
Mar. 15, 2019  (JP) .................. 2019-048082

(51) Int. Cl.
- *C08G 18/38* (2006.01)
- *G01B 1/00* (2006.01)
- *G02B 1/04* (2006.01)
- *G02B 5/30* (2006.01)

(52) U.S. Cl.
CPC ......... *C08G 18/3876* (2013.01); *G02B 1/041* (2013.01); *G02B 5/305* (2013.01)

(58) Field of Classification Search
CPC ..... C08G 18/3876; G02B 1/041; G02B 5/305
See application file for complete search history.

(56) References Cited

U.S. PATENT DOCUMENTS

| | | | |
|---|---|---|---|
| 2004/0102598 A1* | 5/2004 | Alferiev | A61L 27/18 528/45 |
| 2008/0036964 A1 | 2/2008 | Miura et al. | |
| 2014/0327869 A1 | 11/2014 | Renzi et al. | |
| 2015/0353791 A1* | 12/2015 | Ishihara | C08G 18/8025 156/331.7 |
| 2017/0037179 A1* | 2/2017 | Ishihara | B32B 25/08 |
| 2018/0258212 A1 | 9/2018 | Kadowaki et al. | |
| 2020/0407482 A1* | 12/2020 | Torkelson | C08G 18/161 |

FOREIGN PATENT DOCUMENTS

| | | | |
|---|---|---|---|
| JP | S59169820 A | | 9/1984 |
| JP | 2001-302755 A | | 10/2001 |
| JP | 2015504099 A | | 2/2015 |
| JP | 2017214488 A | * | 12/2017 |
| WO | 2008018168 A1 | | 2/2008 |
| WO | 2017047744 A1 | | 3/2017 |

OTHER PUBLICATIONS

JP-2017214488_12-2017_English Translation.*

* cited by examiner

*Primary Examiner* — Michael L Leonard
(74) *Attorney, Agent, or Firm* — BUCHANAN INGERSOLL & ROONEY PC

(57) ABSTRACT

A molded product of the present invention includes a polythiourethane, in which an SH group concentration according to an IR analysis method is 0.30 wt % to 3.0 wt %.

8 Claims, No Drawings

MOLDED PRODUCT AND USES THEREOF

TECHNICAL FIELD

The present invention relates to a molded product and uses thereof.

BACKGROUND ART

In comparison with inorganic lenses, plastic lenses are lighter, harder to break, and more dyeable and have thus rapidly become widespread in optical elements such as spectacle lenses and camera lenses.

Among the above, typical examples thereof include allyl resins obtained from diethylene glycol bisallyl carbonate and diaryl isophthalate, (meth)acrylic resins obtained from (meth)acrylate, and polythiourethane resins obtained from isocyanate and thiol. Among the above, polythiourethane resin is light weight and also exhibits a high refractive index, low dispersion and excellent transparency, and is thus extremely useful as a material for plastic lenses.

Patent Document 1 discloses a molded product obtained from a polymerizable composition including a polyisocyanate compound, a specific polythiol compound, a specific thiol compound, and a catalyst. The above lens is described as having excellent impact resistance and dyeability.

Patent Document 2 discloses a molded product obtained from a polymerizable composition including a polyisocyanate compound, a polyol compound, a polythiol compound, and a photochromic compound. The above molded product is described as having an SH group concentration of less than 1.0 wt % according to an IR analysis method.

RELATED DOCUMENT

Patent Document

[Patent Document 1] PCT Japanese Translation Patent Publication No. 2015-504099
[Patent Document 2] International Publication No. 2017/47744

SUMMARY OF THE INVENTION

Technical Problem

However, in the related art techniques described in Patent Document 1, although the impact resistance and dyeability are excellent in a case where specific compounds are combined, there was a demand for a method to obtain a molded product for which the above characteristics are excellent regardless of the combination of monomers and the like.

In addition, Patent Document 2 does not describe impact resistance or dyeability.

Solution to Problem

As a result of intensive studies, the present inventors found that a molded product with an SH group concentration in a predetermined range has excellent impact resistance and dyeability, thereby completing the present invention.

That is, it is possible to describe the present invention as follows.

[1] A molded product including a polythiourethane, in which an SH group concentration according to an IR analysis method is 0.30 wt % to 3.0 wt % (except in a case where a photochromic compound is included).

[2] The molded product according to [1], in which the polythiourethane is comprised of a constituent unit derived from a polyisocyanate compound (A) and a constituent unit derived from a polythiol compound (B), the polyisocyanate compound (A) is one or more selected from the group consisting of hexamethylene diisocyanate, pentamethylene diisocyanate, xylylene diisocyanate, isophorone diisocyanate, bis(isocyanatomethyl)cyclohexane, dicyclohexylmethane diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and diphenylmethane diisocyanate, and the polythiol compound (B) is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate).

[3] An optical material including the molded product according to [1] or [2].

[4] A plastic lens including the molded product according to [1] or [2].

[5] The plastic lens according to [4], including a base material layer comprised of the molded product according to [1] or [2], and a functional layer formed over at least one surface of the base material layer.

[6] A plastic polarized lens including a polarizing film, and a base material layer, which is comprised of the molded product according to [1] or [2], formed on at least one surface of the polarizing film.

[7] The plastic polarized lens according to [6], further including a functional layer formed over at least one surface of the polarizing film.

Advantageous Effects of Invention

According to the present invention, it is possible to provide a molded product, which is excellent in releasability, impact resistance, and dyeability, and an optical material and plastic lenses comprised of the molded product.

DESCRIPTION OF EMBODIMENTS

A description will be given of the present invention by means of embodiments.

The molded product of the present embodiment includes a polythiourethane, in which the SH group concentration according to an IR analysis method is 0.10 wt % to 3.0 wt %, and preferably 0.30 wt % to 3.0 wt %. The molded product of the present embodiment does not include a photochromic compound.

The molded product of the present embodiment is excellent in releasability, impact resistance, and dyeability, since the SH group concentration is in the predetermined range.

It is possible to obtain the molded product of the present embodiment by using a polymerizable composition including a polyisocyanate compound (A) and a polythiol compound (B).

[Polyisocyanate Compound (A)]

It is possible to use the polyisocyanate compound (A) selected from polyisocyanate compounds known in the related art as long as it is possible to obtain the effect of the present invention.

Examples of the polyisocyanate compound (A) in the present embodiment include aliphatic polyisocyanate compounds such as hexamethylene diisocyanate, pentamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, p-xylylene diisocyanate, α,α,α',α'-tetramethylxylylene diisocyanate, bis(isocyanatomethyl)naphthalene, 1,3,5-tris(isocyanatomethyl)benzene, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane; alicyclic polyisocyanate compounds such as isophorone diisocyanate, 1,3-bis(isocyanatomethyl)cyclohexane, 1,4-bis(isocyanatomethyl)cyclohexane, dicyclohexylmethane-4,4'-diisocyanate, dicyclohexylmethane-2,4'-diisocyanate, cyclohexanediisocyanate, methylcyclohexanediisocyanate, dicyclohexyl dimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane; aromatic polyisocyanate compounds such as diphenyl sulfide-4,4'-diisocyanate, tolylene diisocyanate, phenylene diisocyanate, and diphenylmethane diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane, and the like. As the polyisocyanate compound (A), it is possible to use at least one selected from the above.

Examples of the polyisocyanate compound (A) include, in addition to monomers, modified forms and/or mixtures with modified products and examples of the modified forms of the isocyanate include a multimer, a biuret modified form, an allophanate modified form, an oxadiazinetrione modified form, a polyol modified form, and the like. Examples of multimers include dimers such as uretdiones, uretoimines, and carbodiimides, and trimers or higher multimers such as isocyanurates and iminooxadiazinediones.

As the polyisocyanate compound (A), one or more selected from the group consisting of hexamethylene diisocyanate, pentamethylene diisocyanate, xylylene diisocyanate, isophorone diisocyanate, bis(isocyanatomethyl)cyclohexane, dicyclohexylmethane diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, phenylene diisocyanate, and diphenylmethane diisocyanate is preferable.

[(B) Polythiol Compound]

It is possible to select and use the polythiol compound (B) from polythiol compounds known in the related art as long as it is possible to obtain the effect of the present invention.

Examples of the polythiol compound (B) in the present embodiment include aliphatic polythiol compounds such as methane dithiol, 1,2-ethanedithiol, 1,2,3-propanetrithiol, 1,2-cyclohexanedithiol, bis(2-mercaptoethyl ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, esters of thioglycolic acid and mercaptopropionic acid thereof, hydroxymethylsulfide bis(2-mercaptoacetate), hydroxymethylsulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluene dithiol, 3,4-toluene dithiol, 1,5-naphthalene dithiol, and 2,6-naphthalene dithiol; heterocyclic polythiol compounds such as 2-methylamino-4,6-dithiol-sym-triazine, 3,4-thiophene dithiol, bismethiol, 4,6-bis(mercaptomethylthio)-1,3-dithiane, and 2-(2,2-bis(mercaptomethylthio)ethyl)-1,3-dithiethane; and the like. As the polythiol compound (B), it is possible to use at least one selected from the above.

As the polythiol compound (B), at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl) sulfide, 1,1,3,3-tetrakis(mercaptomethylthio) propane, 4,6-bis(mercaptomethylthio)-1,3-dithiane, 2-(2,2-bis(mercaptomethylthio)ethyl)-1,3-dithiethane, 1,1,2,2-tetrakis(mercaptomethylthio) ethane, 3-mercaptomethyl-1,5-dimercapto-2,4-dithiapentane, tris(mercaptomethylthio) methane, and ethylene glycol bis(3-mercaptopropionate) is preferable.

[Other Components]

In the present embodiment, in addition to the (A) and (B) components described above, a polymerization catalyst, an internal release agent, a resin modifier, and the like may be further included.

Examples of the polymerization catalyst include a tertiary amine compound and inorganic acid salts or organic acid salts thereof, a metal compound, a quaternary ammonium salt, and an organic sulfonic acid.

It is possible to use acidic phosphate esters as internal release agents. Examples of acidic phosphate esters include phosphoric acid monoesters and phosphoric acid diesters and it is possible to use each alone or in a mixture of two or more kinds. As commercial products of such internal release agents, for example, it is possible to use ZelecUN manufactured by STEPAN Company, internal release agents for MR manufactured by Mitsui Chemicals, Inc., the JP series manufactured by Johoku Chemical Co., Ltd., the Phosphanol series manufactured by Toho Chemical Industry Co., Ltd., the AP and DP series manufactured by Daihachi Chemical Industry Co., Ltd., and the like.

Examples of resin modifiers include episulfide compounds, alcohol compounds, amine compounds, epoxy compounds, organic acids and anhydrides thereof, olefin compounds including (meth)acrylate compounds or the like, and the like.

Examples of preferable combinations of the polyisocyanate compound (A) and the polythiol compound (B) include:

Combination A of xylylene diisocyanate and a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;

Combination B of dicyclohexylmethane diisocyanate and a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane; and Combination C of a mixture of 2,5-bis(isocyanatomethyl)bicyclo-[2.2.1]-heptane and 2,6-bis(isocyanatomethyl)bicyclo-[2.2.1]-heptane, and 4-mercaptomethyl-1,8-dimercapto-3,6-dithiaoctane.

<Method for Producing Polymerizable Composition>

It is possible to prepare the polymerizable composition in the present embodiment by mixing the polyisocyanate compound (A), the polythiol compound (B), and other components as necessary with a method known in the related art. The polymerizable composition in the present embodiment does not include a photochromic compound.

In the composition above, the molar ratio (NCO group/SH group) of the NCO group included in the polyisocyanate compound (A) with respect to the SH group included in the polythiol compound (B) is in the range of 0.8 to 1.2, preferably 0.9 to 1.15, and more preferably 0.95 to 1.1. In the molar ratio range described above, it is possible to suitably adjust the SH group concentration according to an IR analysis method.

The temperature in a case where the polymerizable composition is prepared by mixing the polyisocyanate compound (A), the polythiol compound (B), and other components is usually 25° C. or lower. From the viewpoint of the pot life of the polymerizable composition, it may be preferable to further lower the temperature. However, in a case where the solubility of the catalyst, internal release agent, and additives in the monomer is not good, it is also possible to dissolve the above in the monomer and the resin modifier in advance by heating.

The order of mixing and the method for mixing each component in the composition are not particularly limited as long as it is possible to mix each component uniformly and it is possible to use known methods. As known methods, for example, there is a method of preparing a master batch including a predetermined amount of the additive and dispersing and dissolving this master batch in a solvent, or the like.

In the present embodiment, it is possible to obtain a molded product by polymerizing and curing the polymerizable composition. It is possible to determine the SH group concentration of the molded product according to an IR analysis method. For example, it is possible to measure the IR spectrum of a sample (molded product) cut to a thickness of 0.30 mm and subjected to a polishing process using a Spectrum One IR analyzer manufactured by PERKIN-ELMER, to determine the absorbance by a baseline method using the absorption at 2257 cm$^{-1}$ for NCO and 2550 cm$^{-1}$ for SH, and to determine the SH group concentration by calculation from a calibration curve created in advance by the formula below.

$$NCO\ wt\ \% = \frac{[8.3898(NCOA - 0.2421) - 0.0981] \times 0.042}{1350} \times 100$$

$$SH\ wt\ \% = \frac{[2.8961(SHA - 0.1531) - 0.0167] \times 33}{1350} \times 100$$

NCOA: NCO Abs./mm, SHA: SH Abs./mm

The SH group concentration of the molded product measured in this manner is 0.10 wt % to 3.0 wt %, preferably 0.30 wt % to 3.0 wt %, more preferably 0.40 wt % to 2.8 wt %, and particularly preferably 0.50 wt % to 2.5 wt %. In this range, the molded products have excellent releasability, impact resistance, and dyeability. It is possible to use the molded product of the present embodiment as an optical material.

If the SH group concentration of the molded product obtained from a preferable Combination A of the polyisocyanate compound (A) and the polythiol compound (B) is in the range described above, it is possible to obtain the effect of the present invention; however, the SH group concentration is desirably 0.10 wt % to 3.0 wt %, preferably 0.30 wt % to 3.0 wt %, more preferably 0.40 wt % to 2.5 wt %, and particularly preferably 0.50 wt % to 2.2 wt %.

On the other hand, if the SH group concentration of the molded product obtained from the preferable Combination B is in the range described above, it is possible to obtain the effect of the present invention; however, the SH group concentration is 0.20 wt % to 3.0 wt %, preferably 0.30 wt % to 2.8 wt %, more preferably 0.50 wt % to 2.8 wt %, and particularly preferably 0.50 wt % to 2.5 wt %.

In addition, if the SH group concentration of the molded product obtained from the preferable Combination C is in the range described above, it is possible to obtain the effect of the present invention; however, the SH group concentration is 0.20 wt % to 3.0 wt %, preferably 0.50 wt % to 2.5 wt %, more preferably 1.00 wt % to 2.0 wt %, and particularly preferably 1.50 wt % to 2.0 wt %.

In the present embodiment, the dyeability of the molded product is evaluated by the transmittance with respect to 600 nm wavelength light and the dyeing uniformity and the molded product of the present embodiment has an excellent balance of the above characteristics, resulting in excellent dyeability.

It is possible to obtain the transmittance with respect to 600 nm wavelength light by adding dye to water heated to 90° C. to be a 2% concentration, stirring, then coloring a molded product with a center thickness of 2 mm (for example, a 4-curved plano lens) by immersion therein for 1 hour, irradiating the dyed molded product with 600 nm wavelength light, and measuring the transmittance.

The transmittance of the molded product of the present embodiment after dyeing changes depending on the SH group concentration of the molded product and the kind of monomers forming the molded product; however, it is possible to set the transmittance to 10% to 90%, preferably 15% to 85%, more preferably 20% to 70%, and particularly preferably 30% to 60%.

The NCO group concentration of the molded product measured by the method described above is 0.01 wt % to 3.0 wt %, preferably 0.02 wt % to 2.0 wt %, and more preferably 0.03 wt % to 1.5 wt %. In this range, the molded products have superior releasability, impact resistance, and dyeability.

The NCO group concentration of the molded product obtained from a preferable Combination A of the polyisocyanate compound (A) and the polythiol compound (B) is 0.01 wt % to 2.5 wt %, preferably 0.02 wt % to 1.5 wt %, and even more preferably 0.03 wt % to 1.0 wt %. In this range, the molded products have superior releasability, impact resistance, and dyeability.

In addition, the NCO group concentration of the molded product obtained from the preferable Combination C is 0.5 wt % to 2.5 wt %, and preferably 1.0 wt % to 2.0 wt %. In this range, the molded products have superior releasability, impact resistance, and dyeability.

In the present embodiment, the method for producing an optical material is not particularly limited, but examples of preferable production methods include cast polymerization. First, a polymerizable composition is injected to a space between molds held by a gasket, a tape, or the like. At this time, depending on the physical properties required for the plastic lens to be obtained, in many cases, it is preferable to carry out a defoaming treatment under reduced pressure, a filtration treatment under conditions of pressure and reduced pressure, and the like as necessary.

Since the polymerization conditions vary greatly depending on the composition of the polymerizable composition, the kind and amount of the catalyst used, the shape of the mold, and the like, the conditions are not limited, but the above are performed for approximately 1 to 50 hours at a temperature of −50° C. to 150° C. In some cases, it is preferable to carry out the curing while holding or gradually raising the temperature in a temperature range of 10° C. to 150° C. for 1 to 25 hours.

Adjusting the polymerization conditions in the range described above makes it possible to obtain a molded product with the desired SH group concentration. That is, it is possible to suitably obtain a molded product with excellent releasability, impact resistance, and dyeability.

In the preferable Combination A of the polyisocyanate compound (A) and the polythiol compound (B), it is possible to obtain the molded product with the desired SH group concentration even under the polymerization conditions described above; however, it is preferable to perform the polymerization at a temperature of 25° C. to 120° C. for 24.5 to 50 hours.

On the other hand, in Combination B, it is possible to obtain the molded product with the desired SH group concentration even under the polymerization conditions described above; however, it is preferable to perform the polymerization at a temperature of 20° C. to 140° C. for 39 to 55 hours.

In addition, in Combination C, it is possible to obtain the molded product with the desired SH group concentration even under the polymerization conditions described above; however, it is preferable to perform the polymerization at a temperature of 20° C. to 120° C. for 20.5 to 50 hours.

The optical material may be subjected to a treatment such as annealing as necessary. The treatment temperature is usually 50° C. to 150° C.

In the present embodiment, when preparing the molded product, in addition to the "other components" described above, in the same manner as known molding methods, various additives such as a chain extender, a cross-linking agent, a light stabilizer, an ultraviolet absorber, an antioxidant, a bluing agent, an oil soluble dye, a filler, an adhesion improver, and the like may be added in accordance with the purpose.

<Use>

It is possible to obtain the polymerizable composition of the present embodiment as a molded product of various shapes by changing the kind of mold at the time of cast polymerization. The molded product is provided with a high refractive index and high transparency and is able to be used for various optical materials such as plastic lenses. In particular, it is possible to suitably use the molded product as a plastic spectacle lens or a plastic polarized lens.

Since the polymerizable composition in the present embodiment does not include a photochromic compound, a molded product or plastic lens obtained from the polymerizable composition does not include a photochromic compound.

[Plastic Spectacle Lens]

The plastic spectacle lens using the lens base material comprised of the molded product of the present embodiment may be provided with a functional layer on one surface or both surfaces thereof as necessary.

Specific examples of the functional layer include a primer layer, a hard coat layer, an anti-reflection layer, an anti-fog coating layer, an anti-fouling layer, a water repellent layer, and the like. It is also possible to use each of these functional layers alone, or to use a plurality of functional layers in multiple layers. In a case of applying functional layers on both surfaces, the same functional layer may be provided on each surface or different functional layers may be provided on each surface.

In each of these functional layers, an ultraviolet absorber for the purpose of protecting the lens and eyes from ultraviolet rays, an infrared absorber for the purpose of protecting eyes from infrared rays, a light stabilizer and an antioxidant for the purpose of improving the weather resistance of the lens, a dye or a pigment for the purpose of improving the fashionability of the lens, a photochromic compound, an antistatic agent, and other known additives for improving the performance of the lens may be used in combination. Various leveling agents for the purpose of improving applicability may be used for layers to be coated by coating.

The primer layer is usually formed between a hard coat layer described below and a lens. The primer layer is a functional layer for the purpose of improving the adhesion between the hard coat layer formed thereon and the lens and, in some cases, it is also possible to further improve the impact resistance. It is possible to use any material as the primer layer as long as the material has high adhesion to the obtained lens, but in general, a primer composition in which the main component is a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is also possible to form the primer layer by either method of a coating method or a dry method. In a case of using a coating method, a primer layer is formed by coating the primer composition on a lens by a known coating method such as spin coating, dip coating, or the like and then solidifying the primer composition. In a case where the dry method is used, the primer layer is formed by a known dry method such as a CVD method or a vacuum deposition method. When forming the primer layer, the surface of the lens may be subjected to a pretreatment such as an alkali treatment, a plasma treatment, or an ultraviolet treatment as necessary for the purpose of improving the adhesion. The hard coat layer is a functional layer for the purpose of imparting functions such as scratch resistance, abrasion resistance, moisture resistance, hot water resistance, heat resistance, weather resistance, and the like to the lens surface.

Generally, for the hard coat layer, a hard coat composition is used which includes an organic silicon compound having curability and one or more oxide fine particles of elements selected from the element group of Si, Al, Sn, Sb, Ta, Ce, La, Fe, Zn, W, Zr, In, and Ti and/or one or more fine particles comprised of composite oxides of two or more elements selected from this element group.

In addition to the above components, it is preferable for the hard coat composition to include at least any one of amines, amino acids, metal acetylacetonate complexes, metal salts of organic acids, perchloric acids, salts of perchloric acids, acids, metal chlorides, and multi-functional epoxy compounds. The hard coat composition may be used with an appropriate solvent which does not affect the lens or may be used without a solvent.

The hard coat layer is usually formed by coating a hard coat composition by a known coating method such as spin coating or dip coating and then curing the composition. Examples of curing methods include heat curing, curing methods using energy ray irradiation such as ultraviolet rays or visible light, and the like. In order to suppress the occurrence of interference fringes, it is preferable that the difference in refractive index of the hard coat layer and the lens be in a range of ±0.1.

An anti-reflection layer is usually formed on the hard coat layer as necessary. There are inorganic type and organic type anti-reflection layers and, in the case of an inorganic type, inorganic oxides such as $SiO_2$ and $TiO_2$ are used, and the anti-reflection layer is formed by a dry method such as a vacuum deposition method, a sputtering method, an ion plating method, an ion beam assist method, or a CVD method. In the case of an organic type, the anti-reflection layer is formed by a wet process using an organic silicon compound and a composition including silica-based fine particles having an internal cavity.

There are single layer and multiple-layer anti-reflection layers and, in the case of use as a single layer, it is preferable that the refractive index be at least 0.1 or more lower than the refractive index of the hard coat layer. In order to effectively exhibit the anti-reflection function, it is preferable to form a multiple-layer anti-reflection film, in which case a low refractive index film and a high refractive index film are alternately laminated. Also in this case, the refractive index difference between the low refractive index film and the high refractive index film is preferably 0.1 or more. Examples of high refractive index films include films of $ZnO$, $TiO_2$, $CeO_2$, $Sb_2O_5$, $SnO_2$, $ZrO_2$, $Ta_2O_5$, and the like and examples of low refractive index films include $SiO_2$ films and the like.

On the anti-reflection layer, an anti-fogging layer, an anti-fouling layer, a water repellent layer may be formed, as necessary. As the method for forming the anti-fogging layer, the anti-fouling layer, and the water repellent layer, it is possible to use known anti-fogging treatment methods, anti-fouling treatment methods, water repellent treatment methods, and materials, while the treatment method, the treatment material, and the like are not particularly limited as long as there is no adverse effect on the anti-reflection function. Examples of anti-fogging treatment methods and anti-fouling treatment methods include a method of covering the surface with a surfactant, a method of adding a hydrophilic film to the surface to impart water absorbency, a method of covering the surface with fine irregularities to increase the water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

[Plastic Polarized Lens]

The plastic polarized lens of the present embodiment is provided with a polarizing film, and a base material layer formed on at least one surface of the polarizing film and comprised of the molded product obtained by curing the polymerizable composition in the present embodiment.

In the present embodiment, it is possible to form the polarizing film of a thermoplastic resin. Examples of thermoplastic resins include thermoplastic polyesters, thermoplastic polycarbonates, thermoplastic polyolefins, thermoplastic polyimides, and the like. From the viewpoints of water resistance, heat resistance, and molding processability, thermoplastic polyester and thermoplastic polycarbonates are preferable, and thermoplastic polyesters are more preferable.

Examples of thermoplastic polyesters include polyethylene terephthalate, polyethylene naphthalate, polybutylene terephthalate, and the like, and from the viewpoints of water resistance, heat resistance, and molding processability, polyethylene terephthalate is preferable.

Specific examples of polarizing films include a thermoplastic polyester polarizing film containing a dichroic dye, a polyvinyl alcohol polarizing film containing iodine, a polyvinyl alcohol polarizing film containing a dichroic dye, and the like.

The polarizing film may be used after being subjected to heat treatment for drying and stabilization.

Furthermore, in order to improve the adhesion to the acrylic-based resin, the polarizing film may be used after performing one kind or two or more kinds of pretreatment selected from a primer coating treatment, a chemical treatment (gas or chemical liquid treatment such as an alkali), a corona discharge treatment, a plasma treatment, an ultraviolet irradiation treatment, an electron beam irradiation treatment, a surface roughening treatment, a flame treatment, and the like. Among such pretreatments, one kind or two or more kinds selected from a primer coating treatment, a chemical treatment, a corona discharge treatment, and a plasma treatment are particularly preferable.

It is possible to obtain the plastic polarized lens of the present embodiment by providing, on at least one surface of such a polarizing film, a base material layer obtained by curing the polymerizable composition in the present embodiment.

The method for producing a plastic polarized lens is not particularly limited, but preferable examples thereof include a cast polymerization method.

It is possible for the method for producing a plastic polarized lens of the present embodiment to include, for example:

a step of fixing a polarizing film in a mold for lens casting in a state separated from the mold, a step of injecting the polymerizable composition into at least one of the gaps formed between the polarizing film and the mold, and a step of polymerizing and curing the polymerizable composition to laminate a base material layer on at least one surface of the polarizing film.

A mold for lens casting is generally formed of two substantially disc-shaped glass molds held by a gasket. In the space of this lens casting mold, a polarizing film is installed such that the film surface is parallel to the inner surface of the mold on the front side facing each other. A gap portion is formed between the polarizing film and the mold. The polarizing film may be pre-formed.

The polymerization conditions of the polymerizable composition vary according to the composition of the polymerizable composition, the kind and amount of the catalyst used, the shape of the mold, and the like, but the polymerization is performed at a temperature of 5 to 140° C. for 1 to 50 hours. In some cases, it is preferable to hold or gradually raise the temperature in a temperature range of 5° C. to 130° C. to carry out the curing in 1 to 25 hours.

Adjusting the polymerization conditions in the range described above makes it possible to obtain a molded product with the desired SH group concentration. That is, it is possible to suitably obtain a molded product with excellent releasability, impact resistance, and dyeability.

Releasing the laminate cured by polymerization from the mold makes it possible to obtain the plastic polarized lens of the present embodiment.

In the present embodiment, the laminate after polymerization/release may be subjected to a heat treatment such as annealing as necessary. From the viewpoint of the effect of the present invention, the treatment is performed at a temperature of between 90 to 150° C., preferably 110 to 130° C., and more preferably 115 to 125° C. From the viewpoint of the effect of the present invention, the treatment time is in the range of 1 to 10 hours, and preferably 2 to 5 hours.

Here, a functional layer similar to plastic spectacle lenses may be formed on at least one surface of the polarizing film.

Embodiments of the present invention were described above, but these are examples of the present invention and it is possible to adopt various configurations other than those described above in a range in which the effects of the present invention are not impaired.

EXAMPLES

A more detailed description will be given of below of the present invention through Examples, but the present invention is not limited thereto. In the Examples and Comparative Examples, the methods used for evaluation are as follows.

Residual Functional Group Analysis by IR Measurement

The IR spectrum of a sample (molded product) cut to a thickness of 0.30 mm and subjected to a polishing process was measured using a Spectrum One IR analyzer manufactured by PERKIN-ELMER. The absorbance was determined by the baseline method using the absorption at 2257 $cm^{-1}$ for NCO and 2550 $cm^{-1}$ for SH and determination of the residual functional groups was carried out by calculation from a calibration curve created in advance by the formula below.

$$NCO\ wt\ \% = \frac{[8.3898(NCOA - 0.2421) - 0.0981] \times 0.042}{1350} \times 100$$

$$SH\ wt\ \% = \frac{[2.8961(SHA - 0.1531) - 0.0167] \times 33}{1350} \times 100$$

NCOA: NCO Abs./mm, SHA: SH Abs./mm

Releasability

Fifteen lenses were prepared and the releasability of the molded products from the glass mold was determined according to the following criteria.

(Criteria)

A: Number of lenses able to be released: 15 to 14

B: Number of lenses able to be released: 13 to 10

C: Number of lenses able to be released: 9 to 0

Dyeability (Transmittance, Dyeing Uniformity)

BPI® Gray (manufactured by BPI, Inc.) was added as a dye to water heated to 90° C. to a concentration of 2%, stirring was carried out, then a 4-curve plano lens with a center thickness of 2 mm was colored by immersion therein for 1 hour. The obtained dyed lenses were measured for transmittance (%) of 600 nm wavelength light using the following method and the dyeing uniformity was determined according to the criteria below.

(Transmittance Measurement Method)

Using a Shimadzu spectrophotometer UV-1800 as the measurement device, the UV-visible light spectrum of the lenses dyed as described above was measured and the transmittance (%) of 600 nm wavelength light was calculated.

(Dyeing Uniformity Criteria)

A: No unevenness in dyeing

B: Unevenness in dyeing

Impact Resistance:

Ten kinds of iron ball with different weights of 8.35 g, 16.33 g, 28.13 g, 32.63 g, 44.85 g, 66.82 g, 95.01 g, 111.78 g, 173.58 g, 225.5 g were dropped in order starting with the lightest weight from a position of a height of 127 cm (50 inches) onto the center of a lens with a center thickness of 1.1 mm and the lenses were tested for breaking. For evaluation, five lenses were tested and the average value of the maximum weight at which the lens did not break was set as the value of impact resistance.

Comparative Example 1

0.050 parts by weight of dimethyl tin (II) dichloride as a catalyst, 1 part by weight of an internal release agent for MR manufactured by Mitsui Chemicals, Inc., as an internal release agent, 6 parts by weight of each of Tinuvin 329 and Seesorb 706 as ultraviolet absorbers, and 507 parts by weight of m-xylylene diisocyanate were introduced into a preparation container provided with a stirring blade, a thermometer, and a pressure gauge and completely dissolved by stirring at 25° C. for 1 hour to prepare a mixed solution. The mixed solution was completely dissolved by stirring at 25° C. for 1 hour. Thereafter, 493 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were introduced into the mixed solution and the result was stirred at 25° C. for 30 minutes to make a uniform solution. The solution was defoamed at 400 Pa for 1 hour, filtered through a 1 μm PTFE filter, and then injected into a glass mold. The glass mold temperature was increased from 20° C. to 120° C. over 24 hours. After cooling to room temperature, a molded product was obtained by being removed from the glass mold.

The molded product was colorless and transparent. Next, the amounts of the residual —NCO and —SH groups of the molded product was quantified by an IR analysis method. In addition, the releasability, dyeability, and impact resistance (drop ball test) of these molded products were evaluated. These results are shown in Table-1.

Examples 1 to 3, Comparative Example 2

Molded articles were prepared in the same manner as in Comparative Example 1 except that the polymerization time was changed as described in Table-1.

The molded products were colorless and transparent. Next, the amounts of the residual —NCO and —SH groups of the molded products were quantified by an IR analysis method. In addition, the releasability, dyeability, and impact resistance (drop ball test) of these molded products were evaluated. These results are shown in Table-1.

589 parts by weight of dicyclohexylmethane diisocyanate were introduced into a preparation container provided with a stirring blade, a thermometer, and a pressure gauge, and completely dissolved by stirring at 25° C. for 1 hour to prepare a mixed solution. The mixed solution was completely dissolved by stirring at 25° C. for 1 hour. Thereafter, 411 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane were introduced into the mixed solution and the result was stirred at 25° C. for 30 minutes to make a uniform solution. The solution was defoamed at 400 Pa for 1 hour, filtered through a 1 μm PTFE filter, and then injected into a glass mold. The glass mold temperature was increased from 20° C. to 140° C. over 38.5 hours. After cooling to room temperature, a molded product was obtained by being removed from the glass mold.

The molded product was colorless and transparent. Next, the amounts of the residual —SH groups of the molded product were quantified by an IR analysis method. In addition, the releasability, dyeability, and impact resistance (drop ball test) of these molded products were evaluated. These results are shown in Table-2.

Examples 4 to 7 and Comparative Example 4

Molded articles were prepared in the same manner as in Comparative Example 3, except that the polymerization time was changed as described in Table-2.

The molded products were colorless and transparent. Next, the amounts of the residual —SH groups of the molded product were quantified by an IR analysis method.

TABLE 1

| | | Comparative Example 1 | Example 1 | Example 2 | Example 3 | Comparative Example 2 |
|---|---|---|---|---|---|---|
| Polymerizable composition | | a1/b1 | a1/b1 | a1/b1 | a1/b1 | a1/b1 |
| Polymerization time (hr) | | 24 | 25 | 27 | 45 | 68 |
| Residual NCO group concentration (wt %) | | Detection limit or more | 0.692 | 0.381 | 0.065 | Detection limit or less |
| Residual SH group concentration (wt %) | | 3.16 | 2.08 | 1.03 | 0.51 | Detection limit or less |
| Releasability | | B (10/15) | A (14/15) | A (15/15) | A (15/15) | A (15/15) |
| Dyeability | Transmittance (%) 600 nm | 24.79 | 33.96 | 42.99 | 51.49 | 50.30 |
| | Dyeing uniformity | B | A | A | A | A |
| Impact resistance (g) | | 60.67 | 117.67 | 113.96 | 144.92 | 68.65 |

The compounds described in Table-1 are as follows.
a1: m-xylylene diisocyanate
b1: a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane Comparative Example 3

1.8 parts by weight of dibutyltin (II) dichloride as a catalyst, 1.2 parts by weight of an internal release agent for MR manufactured by Mitsui Chemicals, Inc., as an internal release agent, 6.4 parts by weight of Tinuvin 326 as an ultraviolet absorber, 15 parts by weight of Eversorb 109, and In addition, the releasability, dyeability, and impact resistance (drop ball test) of these molded products were evaluated. These results are shown in Table-2.

Comparative Example 5

589 parts by weight of dicyclohexylmethane diisocyanate, 6.4 parts by weight of Tinuvin 326, 15.0 parts by weight of Eversorb 109, 0.8 parts by weight of ZelecUN, and 5.0 parts by weight of polyether-modified siloxane compound (KL-100: manufactured by Kyoeisha Chemical Co., Ltd.) were introduced to prepare a mixed solution. After the mixed solution was completely dissolved in a nitrogen atmosphere at 20° C., a mixed solution of 1.5 parts by weight of dibutyltin (II) dichloride and 411 parts by weight of a polythiol compound which is a mixture of 5,7 (or 4,7 or 4,8)-dimercaptomethyl-1,11-mercapto-3,6,9-trithiaundecane was charged therein, stirred and mixed at 20° C. for 20 minutes, then defoamed under reduced pressure of 400 Pa for 30 minutes, filtered through a 1 µm PTFE filter and then injected into a glass mold. The temperature of the glass mold was increased from 20° C. to 140° C. over 50 hours. After cooling to room temperature, a molded product was obtained by being removed from the glass mold. Thereafter, an annealing treatment was carried out at 120° C. for 2 hours.

The molded product was colorless and transparent. The amount of the residual —SH groups of the molded product was quantified by an IR analysis method and was 0.24%. In addition, the releasability, dyeability, and impact resistance (drop ball test) of these molded products were evaluated. These results are shown in Table-2.

TABLE 2

| | Comparative Example 3 | Example 4 | Example 5 | Example 6 | Example 7 | Comparative Example 4 | Comparative Example 5 |
|---|---|---|---|---|---|---|---|
| Polymerizable composition | a2/b1 | a2/b1 | a2/b1 | a2/b1 | a2/b1 | a2/b1 | a2/b1 |
| Polymerization time (hr) | 38.5 | 39.5 | 40 | 44 | 50 | 56 | 50 + 2 (Annealing) |
| Residual SH group concentration (wt %) | 4.14 | 2.80 | 2.43 | 1.21 | 0.58 | 0.29 | 0.24 |
| Releasability | A (15/15) | A (15/15) | A (15/15) | A (15/15) | A (15/15) | A (15/15) | A (15/15) |
| Dyeability Transmittance (%) 600 nm | 30.58 | 64.40 | 54.80 | 79.17 | 85.40 | 86.62 | 84.69 |
| Dyeing uniformity | B | A | A | A | A | A | A |
| Impact resistance (g) | 215.12 | 160.64 | 255.50 | 150.80 | 168.25 | 106.16 | 123.8 |

The compounds described in Table-2 are as follows.
a2: dicyclohexylmethane diisocyanate
b1: a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane Comparative Example 6

0.35 parts by weight of dibutyltin (II) dichloride as a catalyst, 1.0 part by weight of an internal release agent for MR manufactured by Mitsui Chemicals, Inc., as an internal release agent, 15 parts by weight of Tinuvin 326 as an ultraviolet absorber, and 50.6 parts by weight of a mixture of 2,5-bis(isocyanatomethyl)bicyclo-[2.2.1]-heptane and 2,6-bis(isocyanatomethyl)bicyclo-[2.2.1]-heptane were introduced to prepare a mixed solution. The mixed solution was completely dissolved by stirring at 25° C. for 1 hour. Thereafter, 434 parts by weight of 4-mercaptomethyl-1,8-dimercapto-3,6-dithioctane were introduced into the mixed solution and the result was stirred at 25° C. for 30 minutes to make a uniform solution. The solution was defoamed at 400 Pa for 1 hour, filtered through a 1 µm PTFE filter, and then injected into a glass mold. The glass mold temperature was increased from 20° C. to 140° C. over 19.2 hours. After cooling to room temperature, a molded product was obtained by being removed from the glass mold.

The molded product was colorless and transparent. Next, the amounts of the residual —NCO and —SH groups of the molded product were quantified by an IR analysis method. In addition, the releasability, dyeability, and impact resistance (drop ball test) of these molded products were evaluated. These results are shown in Table-3.

Examples 8 to 11, Comparative Examples 7 to 9

Molded articles were prepared in the same manner as in Comparative Example 6, except that the polymerization times were changed as described in Table-3.

The molded products were colorless and transparent. Next, the amounts of the residual —NCO and —SH groups of the molded product were quantified by an IR analysis method. In addition, the releasability, dyeability, and impact resistance (drop ball test) of these molded products were evaluated. These results are shown in Table-3.

Example 12

0.015 parts by weight of dibutyltin (II) dichloride as a catalyst, 0.1 part by weight of an internal release agent for MR manufactured by Mitsui Chemicals, Inc., as an internal release agent, 0.15 parts by weight of Tinuvin 329 as an ultraviolet absorber, and 52 parts by weight of m-xylylene diisocyanate were introduced into a preparation container provided with a stirring blade, a thermometer, and a pressure gauge and completely dissolved by stirring at 25° C. for 1 hour. Thereafter, 48 parts by weight of 4-mercaptomethyl-1,8-dimercapto-3,6-dithiaoctane were introduced into the mixed solution and the result was stirred at 25° C. for 30 minutes to make a uniform solution. The solution was defoamed at 400 Pa for 1 hour, filtered through a 1 µm PTFE filter, and then injected into a glass mold. The glass mold temperature was increased from 25° C. to 120° C. After cooling to room temperature, a molded product was obtained by being removed from the glass mold.

The molded product was colorless and transparent. Next, the amount of the residual —SH groups of the molded product was quantified by an IR analysis method and, as a result, the residual SH group concentration was 1 wt %. In addition, the evaluation results of the releasability, dyeability, and impact resistance (drop ball test) of these molded products were good.

TABLE 3

| | Comparative Example 6 | Comparative Example 7 | Comparative Example 8 | Example 8 | Example 9 | Example 10 | Example 11 | Comparative Example 9 |
|---|---|---|---|---|---|---|---|---|
| Polymerizable composition | a3/b2 | a3/b2 | a3/b2 | a3/b2 | a3/b2 | a3/b2 | a3/b2 | a3/b2 |
| Polymerization time (hr) | 19.2 | 19.5 | 20 | 20.8 | 23 | 25 | 28 | 63 |
| Residual NCO group concentration (wt %) | Detection limit or more | Detection limit or more | 0.77 | 0.39 | 0.24 | 0.15 | 0.081 | 0.006 |
| Residual SH group concentration (wt %) | 4.86 | 4.56 | 3.40 | 1.95 | 1.76 | 1.60 | 1.52 | 0.15 |
| Releasability | A (15/15) | A (15/15) | A (15/15) | A (15/15) | A (15/15) | A (15/15) | A (15/15) | B (13/15) |
| Dyeability Transmittance (%) 600 nm | 9.88 | 9.62 | 20.59 | 27.52 | 42.68 | 47.45 | 51.50 | 56.72 |
| Dyeing uniformity | B | B | B | A | A | A | A | A |
| Impact resistance (g) | 199.40 | 189.37 | 225.50 | 225.50 | 225.50 | 225.50 | 225.50 | 189.37 |

The compounds described in Table-3 are as follows.

a3: a mixture of 2,5-bis(isocyanatomethyl)bicyclo-[2.2.1]-heptane and 2,6-bis(isocyanatomethyl)bicyclo-[2.2.1]-heptane b2: 4-mercaptomethyl-1,8-dimercapto-3,6-dithiaoctane From the results described in Table-1 to Table-3, it was confirmed that, when the residual amount of SH groups in the molded product is 0.30 wt % to 3.0 wt %, the balance of the releasability, impact resistance, and dyeability is excellent.

It was estimated that it is also possible to obtain the same results for plastic polarized lenses.

This application claims priority based on Japanese application 2019-048082 filed on Mar. 15, 2019, the entire disclosure of which is hereby incorporated herein.

The invention claimed is:

1. A molded product comprising:
a polythiourethane,
wherein an SH group concentration of the molded product, according to an IR analysis method, is 0.50 wt % to 2.8 wt %, and
wherein the molded product does not include a photochromic compound,
wherein the polythiourethane is comprised of a constituent unit derived from a polyisocyanate compound (A) and a constituent unit derived from a polythiol compound (B),
the polyisocyanate compound (A) is one or more selected from the group consisting of hexamethylene diisocyanate, pentamethylene diisocyanate, xylylene diisocyanate, isophorone diisocyanate, bis (isocyanatomethyl) cyclohexane, dicyclohexylmethane diisocyanate, 2,5-bis (isocyanatomethyl) bicyclo-[2.2.1]-heptane, 2,6-bis (isocyanatomethyl) bicyclo-[2.2.1]-heptane, tolylene diisocyanate, phenylene diisocyanate, and diphenylmethane diisocyanate, and
the polythiol compound (B) is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis (2-mercaptoacetate), pentaerythritol tetrakis (3-mercaptopropionate), 2,5-bis (mercaptomethyl)-1,4-dithiane, bis (mercaptoethyl) sulfide, 1,1,3,3-tetrakis (mercaptomethylthio) propane, 4,6-bis (mercaptomethylthio)-1,3-dithiane, 2-(2,2-bis (mercaptomethylthio) ethyl)-1,3-dithiethane, 1,1,2,2-tetrakis (mercaptomethylthio) ethane, 3-mercaptomethyl-1,5-dimercapto-2,4-dithiapentane, tris (mercaptomethylthio) methane, and ethylene glycol bis (3-mercaptopropionate).

2. An optical material comprising:
the molded product according to claim 1.

3. A plastic lens comprising:
the molded product according to claim 1.

4. A plastic lens comprising:
a base material layer comprised of the molded product according to claim 1; and
a functional layer formed over at least one surface of the base material layer.

5. A plastic polarized lens comprising:
a polarizing film; and
a base material layer, which is comprised of the molded product according to claim 1, formed on at least one surface of the polarizing film.

6. The plastic polarized lens according to claim 5, further comprising:
a functional layer formed over at least one surface of the polarizing film.

7. The molded product according to claim 1,
wherein the polythiourethane is comprised of a constituent unit derived from a polyisocyanate compound (A) and a constituent unit derived from a polythiol compound (B),
wherein combinations of the polyisocyanate compound (A) and the polythiol compound (B) include:
combination A of xylylene diisocyanate and a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;
combination B of dicyclohexylmethane diisocyanate and a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane; and
combination C of a mixture of 2,5-bis (isocyanatomethyl) bicyclo-[2.2.1]-heptane and 2,6-bis (isocyanatomethyl) bicyclo-[2.2.1]-heptane, and 4-mercaptomethyl-1,8-dimercapto-3,6-dithiaoctane.

8. The molded product according to claim 1,
wherein the NCO group concentration of the molded product, according to an IR analysis method, is 0.03 wt % to 1.0 wt %.

* * * * *